United States Patent
Guo

(10) Patent No.: US 12,293,071 B2
(45) Date of Patent: May 6, 2025

(54) METHOD FOR ZOOMING AN IMAGE DISPLAYED ON A TOUCH-SENSITIVE SCREEN OF A MOBILE TERMINAL

(71) Applicant: ORANGE, Issey-les-Moulineaux (FR)

(72) Inventor: Zhihong Guo, Beijing (CN)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/767,883

(22) PCT Filed: Nov. 30, 2018

(86) PCT No.: PCT/IB2018/001502
§ 371 (c)(1),
(2) Date: May 28, 2020

(87) PCT Pub. No.: WO2019/106431
PCT Pub. Date: Jun. 6, 2019

(65) Prior Publication Data
US 2020/0371681 A1    Nov. 26, 2020

(30) Foreign Application Priority Data

Dec. 1, 2017 (WO) ................ PCT/CN2017/114179

(51) Int. Cl.
*G06F 3/04883* (2022.01)
*G06F 3/04845* (2022.01)

(52) U.S. Cl.
CPC ...... *G06F 3/04883* (2013.01); *G06F 3/04845* (2013.01); *G06F 2203/04806* (2013.01)

(58) Field of Classification Search
CPC ....... G06F 3/04883; G06F 2203/04806; G06F 3/04845
See application file for complete search history.

(56) References Cited

U.S. PATENT DOCUMENTS

| | | | |
|---|---|---|---|
| 2010/0289825 A1* | 11/2010 | Shin | ................... G06F 3/04883 345/173 |
| 2013/0176344 A1 | 7/2013 | Mandic et al. | |
| 2013/0176439 A1* | 7/2013 | Lee | ................... H04N 5/23299 348/E5.042 |
| 2014/0043255 A1 | 2/2014 | Liu et al. | |

(Continued)

FOREIGN PATENT DOCUMENTS

| | | |
|---|---|---|
| EP | 2256609 A2 | 12/2010 |
| EP | 2306288 A1 | 4/2011 |
| EP | 2752757 A1 | 7/2014 |

OTHER PUBLICATIONS

International Search Report dated Apr. 17, 2019 for corresponding International Application No. PCT/IB2018/001502, filed Nov. 30, 2018.

(Continued)

*Primary Examiner* — Andrea C Leggett
(74) *Attorney, Agent, or Firm* — David D. Brush; Westman, Champlin & Koehler, P.A.

(57) ABSTRACT

A method for zooming an image displayed on a touch-sensitive screen of a mobile terminal. The method includes: measuring the duration of a stationary touch gesture by the user on the touch-sensitive screen; determining a zoom ratio as a function of the measured duration; and displaying on the touch-sensitive screen the image zoomed by the determined zoom ratio.

12 Claims, 2 Drawing Sheets

(56) References Cited

U.S. PATENT DOCUMENTS

| | | | |
|---|---|---|---|
| 2014/0059457 A1* | 2/2014 | Min | G06F 3/0484 |
| | | | 715/764 |
| 2014/0184854 A1* | 7/2014 | Musatenko | H04N 23/69 |
| | | | 348/240.2 |
| 2014/0300569 A1 | 10/2014 | Matsuki et al. | |
| 2015/0278165 A1* | 10/2015 | Kim | G06F 40/106 |
| | | | 715/252 |
| 2016/0044236 A1* | 2/2016 | Matsuzawa | H04N 23/61 |
| | | | 348/240.2 |
| 2017/0199662 A1* | 7/2017 | Xia | G06F 3/04883 |

OTHER PUBLICATIONS

Written Opinion of the International Search Report dated Apr. 17, 2019 for corresponding International Application No. PCT/IB2018/001502, filed Nov. 30, 2018.
International Search Report dated Aug. 17, 2018 for corresponding International Application No. PCT/CN2017/114179, filed Dec. 1, 2017.
Written Opinion of the International Searching Authority dated Sep. 3, 2018 for corresponding International Application No. PCT/CN2017/114179, filed Dec. 1, 2017.

* cited by examiner

METHOD FOR ZOOMING AN IMAGE DISPLAYED ON A TOUCH-SENSITIVE SCREEN OF A MOBILE TERMINAL

CROSS-REFERENCE TO RELATED APPLICATIONS

This Application is a Section 371 National Stage Application of International Application No. PCT/IB2018/001502, filed Nov. 30, 2018, which is incorporated by reference in its entirety and published as WO 2019/106431 A1 on Jun. 6, 2019, in English.

FIELD OF THE INVENTION

The field of this invention is that of mobile terminals.
More particularly, the invention relates to a method for controlling a user interface of a mobile terminal and in particular zooming an image displayed on a touch-sensitive screen.

BACKGROUND OF THE INVENTION

Recent mobile terminals such as smartphones are generally no more provided with a physical keyboard. Instead, they present a large touchscreen (covering most of the front surface) which can be controlled using various touch gestures.

One of them is the "pinch" gesture, which allow zoom in or zoom out in the user interface with two fingers (e.g., the thumb and the index finger of the right hand of the user).

More precisely, a so-called pinch-out or outward pinch gesture is known as a user's action or gesture required for zoom in (i.e. enlargement) of an image displayed in the interface. The pinch-out gesture is a gesture in which user moves the two fingers farther apart while touching the touch screen with those two fingers. In contrast, a gesture required for zoom out (i.e. reduction) of the image is a pinch-in or inward pinch gesture in which the user moves two fingers closer together.

The problem with such pinch gesture is that it cannot be performed with the same hand holding the terminal. Indeed, for being securely held the device must be grasped between the thumb and the index finger of a first hand, while these fingers of the second hand are used for performing the pinch gesture.

However, the user does not always have both hands available. If nevertheless trying to perform to pinch gesture with a single hand (if for instance the user is holding a bag with the other hand), the user has to balance the terminal on the middle finger, and is likely to drop it.

There is consequently a need for a solution to zoom in or out with a single hand.

Patent application US 20014/0300569 proposes a method to zoom in or out based on the level of pressure of a finger on the touchscreen. The more the user presses the screen, the more the image is enlarged. This gesture only requires the thumb, so the terminal can be held in the palm.

However, with this prior art method, a refined pressure sensitive touchscreen, which is able to discriminate several levels of pressure force, is required, so this method is only possible for expensive terminals. Moreover, it is difficult to precisely control the level of pressure applied by the thumb, especially if the user is walking in the street, carrying a bag in the other hand, etc., so this method is not fully practical.

European patent application EP 2306288 A1 on the other hand, proposes a method to zoom in our out based on the detection of circular movements on a touch screen, a first rotational direction being associated with a zoom in while a second rotational direction is associated with a zoom out.

Such a method, while not relying on refined pressure sensitive touchscreens, remains quite complex to implement as it requires first the determination of the direction of a touch gesture on the touchscreen (in order to discriminate a curved gesture from other gestures), followed by the determination of the rotational direction of such a curved gesture. The touchscreen and processing unit associated needs thus to be sufficiently sophisticated in order to perform such detections, with an associated cost increase thus. Besides, from a user's point of view, this method is not very user-friendly (especially when the user is moving) and implies risk of errors as the curved gesture may be easily confused with other gestures which are not intended to trigger a zooming operation.

There is consequently still a need for an improved method allowing to easily and universally zoom in or out with a single hand

SUMMARY OF THE INVENTION

For these purposes, the present invention provides a method for zooming an image displayed on a touch-sensitive screen of a mobile terminal, the method comprising:
  measuring the duration of a stationary touch gesture by a user on the touch-sensitive screen;
  determining a zoom ratio as a function of said measured duration; and
  displaying on the touch-sensitive screen said image zoomed by the determined zoom ratio.

As it will be shown, basing the zoom factor on a duration of a stationary touch gesture is reliable, practical for the user, and does not require any expensive hardware.

Preferred but non limiting features of the present invention are as follow:
  the duration measuring step is performed after detecting a trigger touch gesture by the user on the touch-sensitive screen;
    the stationary touch gesture and the trigger touch gesture are the same touch gesture;
    the trigger touch gesture is a touch gesture among a long duration touch gesture, a high force touch gesture and a given swipe touch gesture;
    the stationary touch gesture is a touch gesture among a long duration touch gesture and a high force touch gesture;
  a zooming mode is chosen among a zoom-out mode and a zoom-in mode; the image being zoomed-in or zoomed-out by the determined zoom ratio according to the chosen zooming mode;
  the method further comprises switching the zooming mode from zoom-out mode to zoom-in mode, or from zoom-in mode to zoom-out mode, after detecting a further trigger touch gesture on touch-sensitive screen;
  step comprises switching the zooming mode from zoom-out mode to zoom-in mode, or from zoom-in mode to zoom-out mode, if said measured duration exceeds a maximum duration threshold;
  the measuring and determining steps are dynamically performed while the stationary touch gesture is not over;
  the zoom ratio is determined as an increasing linear, polynomial or exponential function of the measured duration;

the determining and displaying steps are performed only if said measured duration exceeds a minimum duration threshold.

In a second aspect, the invention provides a mobile terminal comprising a processing unit and a touch-sensitive screen, the processing unit being configured to:
measure the duration of a stationary touch gesture by a user on the screen;
determine a zoom ratio as a function of said measured duration; and
instruct the touch-sensitive screen to display an image zoomed by the determined zoom ratio.

According to a third and a fourth aspects, the invention provides a computer program product; comprising code instructions for executing a method according to the first aspect for zooming an image displayed on a touch-sensitive screen of a mobile terminal; and a computer-readable medium, on which is stored a computer program product comprising code instructions for executing a method according to the first aspect for zooming an image displayed on a touch-sensitive screen of a mobile terminal.

BRIEF DESCRIPTION OF THE DRAWINGS

The above and other objects, features and advantages of this invention will be apparent in the following detailed description of an illustrative embodiment thereof, which is to be read in connection with the accompanying drawings wherein.

DETAILED DESCRIPTION OF A PREFERRED EMBODIMENT

Architecture

Figure 1:
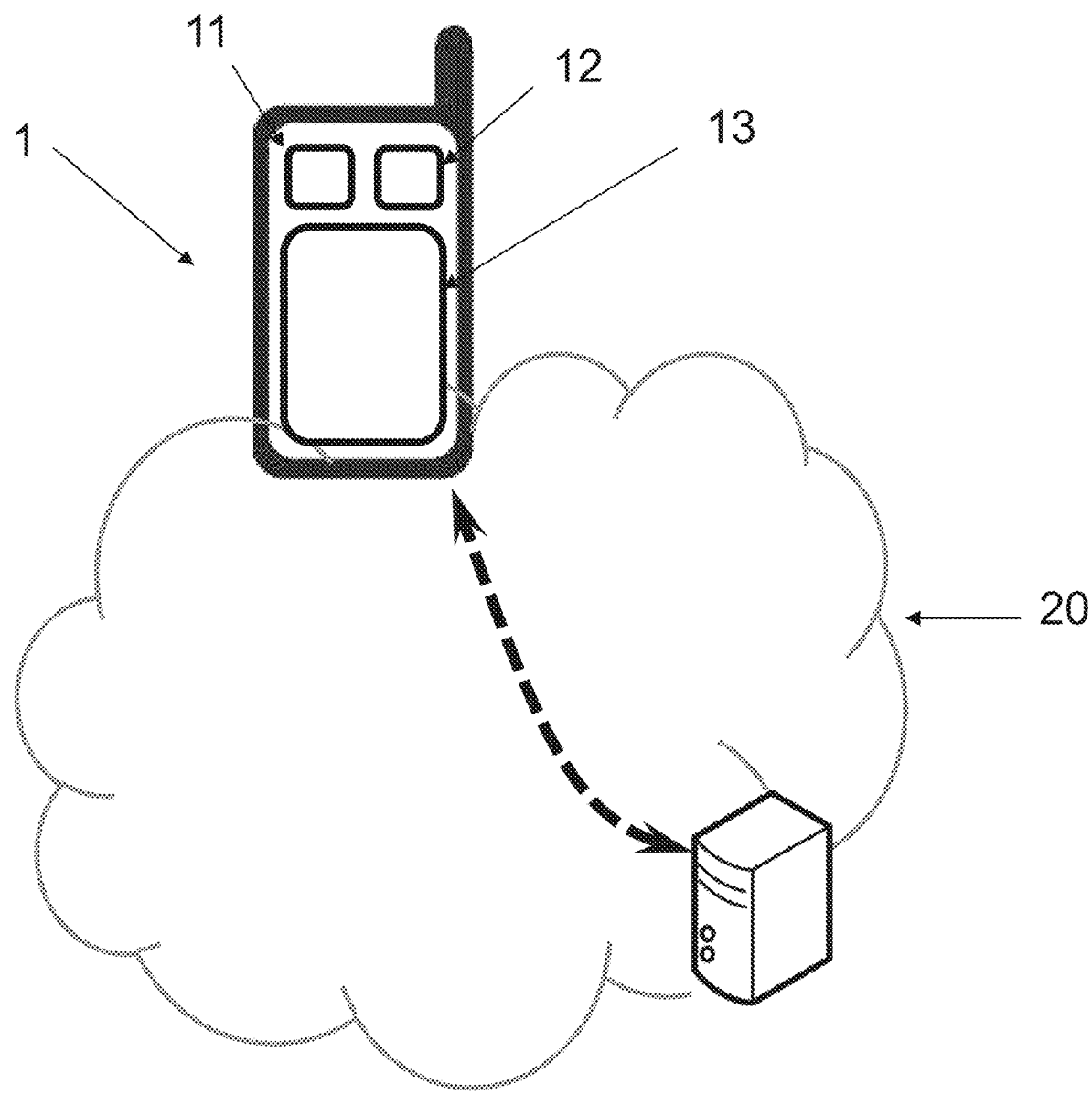
FIG. 1 illustrates an example of architecture in which the method according to the invention is performed.

The present invention relates to a method for controlling a user interface of a mobile terminal 1 as represented by FIG. 1. More precisely, the present method is for zooming an image displayed on a touch-sensitive screen 13 of a mobile terminal 1. It will be understood that by "zooming", it is meant varying the zoom, in other words either "zooming in", i.e. enlarging the image, or "zooming out", i.e. reducing the image.

The mobile terminal 1 is a device comprising a processing unit 11, i.e. a CPU (one or more processors), a memory 12 (for example flash memory), and a touch-sensitive screen 13 for user interface. The memory 12 is in particular for storing applications, which can be of various types, and data. The terminal 1 also typically comprises a battery, in particular a rechargeable battery (for instance lithium polymer), for powering the processing unit 11 and other units.

The terminal 1 may further comprise other units such as a location unit for providing location data representative of the position of the terminal 1 (using for example GPS, network triangulation, etc.), a communication unit for connecting (in particular wirelessly) the terminal 1 to a network 20 (for example WiFi, Bluetooth, and preferably a mobile network, in particular a GSM/UMTS/LTE network, see below), etc.

Indeed, the terminal 1 is typically a smartphone, a tablet computer, a laptop, etc. In the following description the example of a smartphone will be used.

Zooming

The present method may be typically performed by the processing unit 11 of the terminal 1, and may be implemented either by an application of the terminal displaying images (a photo viewer, a mapping service, the camera, etc.), a dedicated software application, or directly by the operating system.

The "image" designates any graphic object at least partially displayed by the screen 13. For instance, if the image is a map, only a part is displayed, the size of this part increasing if the map is zoomed out. The image may be stored on the memory 12, retrieved from a remote server of the network 20, etc.

It is to be noted that the image could also be the live input of a camera of the terminal. In such a case, "zooming" the image could mean controlling the camera output. More precisely:
most of digital cameras of mobile terminals do not have mechanical parts, and only allow "digital zoom", thus zooming the output image is similar to zooming any other image displayed by the screen (i.e. rescaling);
if the digital camera of the mobile terminals has an "optical zoom" (with displaceable lenses), zooming could mean controlling the optical zoom so as to mechanically vary the angle of view.

The present method encompasses these different ways of zooming.

Zoom Gesture

Figure 2:
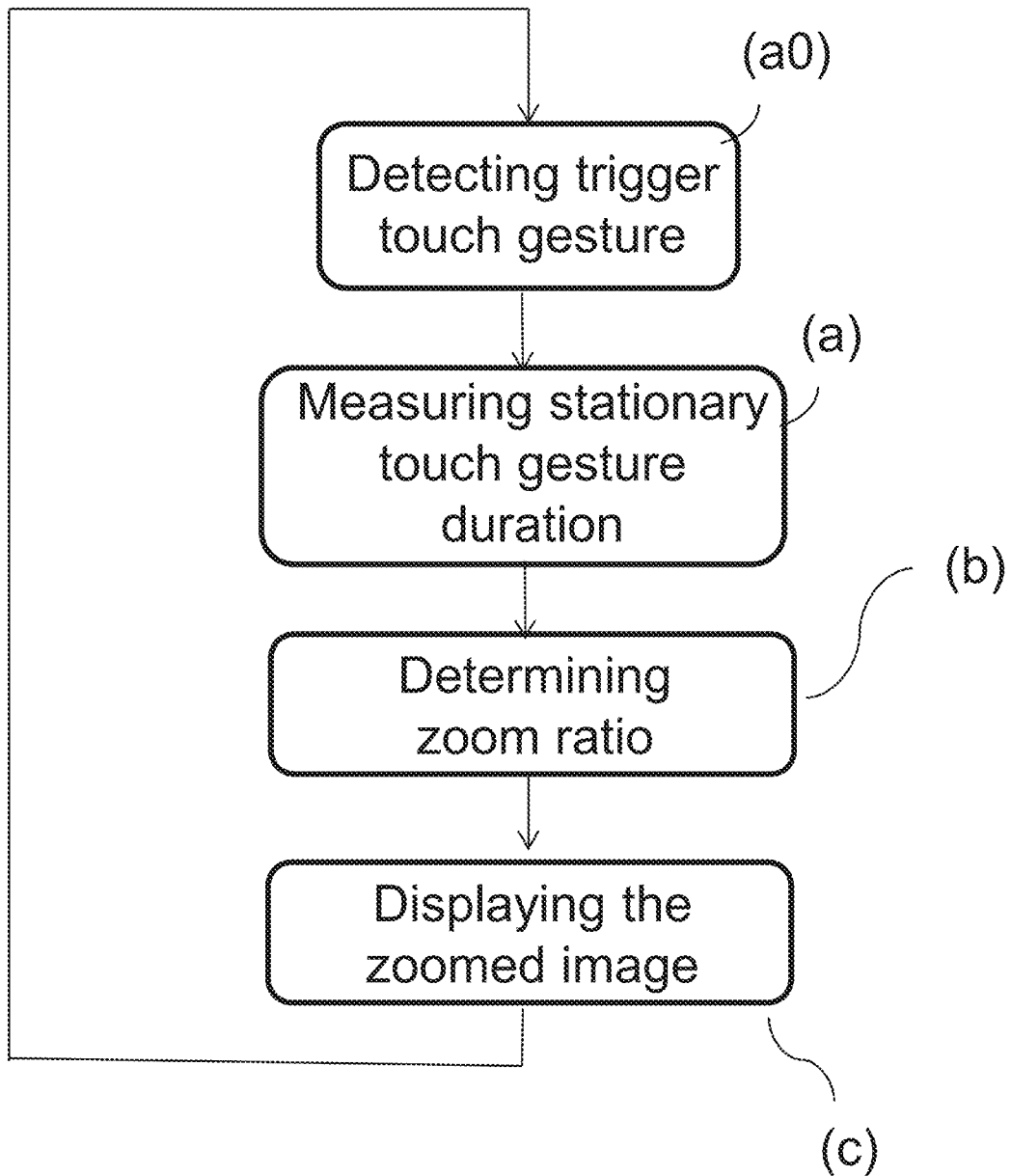
FIG. 2 illustrates an embodiment of a method for zooming an image according to the present invention.

The present method enables zoom in or out with a single hand. As represented by FIG. 2, in a first step (a) the duration of a stationary touch gesture by a user on the touch-sensitive screen 13 is measured, typically by the processing unit 11.

In the context of the present invention, what is meant by "stationary touch gesture" is a touch gesture on the touch-sensitive screen 13 which is sensibly non-moving.

In a first embodiment, such a stationary touch gesture can be a strictly non-moving touch gesture during a duration above a certain threshold (for instance two seconds), i.e. a touch input (typically of a finger) for which the detected area touched on the touch-sensitive screen 13 remains exactly the same during the duration of the touch gesture (in other words, the currently detected touched area maps completely with the initially detected touched area). In that case, this stationary touch gesture ends as soon as the detected touched area changes even slightly.

This first embodiment is particularly appropriate when the present method is to be used in a static context (i.e. when the user himself is not moving, for instance when sitting at a table), in order avoid confusing rather static touch gestures which are not intended to zoom the image with the stationary touch gesture which is intended to zoom the image.

In a less constrained embodiment, such a stationary touch gesture can be not only a strictly non-moving touch gesture, but also a touch gesture which is detected as moving very slightly on screen 13 during a duration above a certain threshold (for instance two seconds), i.e. a touch input (typically of a finger) for which the area touched on the touch-sensitive screen 13 may vary a bit during the duration of the touch gesture.

In this other embodiment, this stationary touch gesture may be determined as ending as soon as the currently detected touched area differs from the initially detected touched area (at the beginning of the touch gesture) by a percentage exceeding a certain threshold (for instance, as soon as more than 10% of the currently detected touched area was not part of the initially detected touched area). In an extreme case of this other embodiment, this stationary touch gesture may be determined as lasting as long as the currently detected touched area overlaps the initially detected touched area.

This other embodiment is particularly appropriate when the present method is to be used in a more dynamic context (e.g. when the user is himself moving, for instance when walking), where keeping a strictly non-moving touch gesture for a long time might prove difficult.

For the sake of clarity, the following touch gestures will be distinguished:
- a "normal touch gesture", i.e. a simple touch gesture (brief, normal pressure and motionless touch gesture) for pressing a button on a touch-sensitive screen;
- an "alternate touch gesture", i.e. a more sophisticated gesture than a simple touch gesture, in particular either a swipe touch gesture (i.e. touching while moving the finger, in particular according to a pattern, for example circles), a long duration touch gesture (i.e. a continuous normal touch, for instance lasting at least a duration threshold such as 0.5 seconds), or a high force touch gesture (i.e. a touch gesture with a pressure exceeding a force threshold, if the screen 13 includes a "3D touch" technology allowing different pressure levels).

It is to be understood that, in the context of the present invention, a normal touch gesture is not considered to have a duration, as it is meant as a "one-off" touch gesture. To the contrary, the alternate touch gestures may last and thus have a certain duration. In particular:
- by definition, the long duration touch gesture lasts and has a duration (it ends when the user lifts the finger);
- a high force touch gesture lasts as long as the finger pressure exceeds said force threshold (it ends when the user decreases the pressure below the force threshold or even lifts the finger);
- a swipe touch gesture lasts as long as the user continuously touches while moving the finger, in particular according to a pattern (it ends when the user stops moving the finger according to the patterns, or even lifts the finger).

The stationary touch gesture could thus be any alternate touch gesture with a duration, i.e. a "lasting" touch gesture, so as to distinguish it from the "normal touch gesture". Advantageously, and as explained, the stationary touch gesture may be chosen among a long duration touch gesture and a high force touch gesture.

Preferably, step (a) is performed after detecting (step a0) a trigger touch gesture by the user on the touch-sensitive screen 13, for instance on an already displayed image. The detection of said trigger touch gesture is thus an event whose detection causes launching the present zooming method.

In such a case, the duration of the stationary touch gesture may be then measured starting from the end of the trigger touch gesture.

Other types of event may be used to this end, but the trigger touch gesture is advantageous, as it also allows selection of the image to be zoomed (if for instance there are several images displayed by the screen 13), the selected image being the one touched using the trigger touch gesture.

It is to be noted that step (a) may further comprises displaying on the screen 13 indication to the user (for example the word "ZOOM MODE") that the trigger touch gesture has been detected and that measurement of the duration is ongoing.

The trigger touch gesture is preferably also an alternate touch gesture (but not necessary one with a duration), and not a normal touch gesture, for not unexpectedly triggering zooming.

The trigger touch gesture could be the same touch gesture as the stationary touch gesture, and may be advantageously also chosen among a long duration touch gesture, a high force touch gesture and a given swipe touch gesture (but the high force touch gesture and the given swipe touch gesture could be "one-off", i.e. brief and non-lasting).

In a first example, both trigger and stationary touch gestures are combined into the same high force touch gesture.

Thus, when the user wants to zoom:
- the user starts touching, on the touch-sensitive screen 13, the image he wants to zoom, and increases the pressure on the touch-sensitive screen 13;
- when the pressure reaches a predetermined pressure threshold, the processing unit detects the occurrence of a trigger gesture, and displays "ZOOM MODE";
- the user holds the high force touch gesture on the touch-sensitive screen 13;
- the processing unit measures the duration of this touch gesture up until its pressure drops under the pressure threshold, this duration being considered as the "duration of the stationary touch gesture".

In a second example, both trigger and stationary touch gestures are combined into the same long duration touch gesture.

Thus, when the user wants to zoom:
- the user starts continuously touching the image he wants to zoom, on the touch-sensitive screen 13;
- After that the duration of this continuous touch reaches a predetermined duration threshold defining a long duration threshold (for instance 0.5 s), the processing unit detects the occurrence of a trigger gesture, and displays "ZOOM MODE";
- The user holds the continuous touch gesture on the touch-sensitive screen 13,
- the processing unit 11 measures the duration of this continuous touch gesture up until the user lifts his finger. The "duration of the stationary touch gesture" corresponds then to the total touch duration minus said predetermined threshold (which is actually the duration of the trigger touch gesture).

In a third example, the trigger touch gesture is a high force touch gesture and the stationary touch gesture is a long duration touch gesture.

Thus, when the user wants to zoom:
- the user starts touching the image he wants to zoom, and increases the pressure, on the touch-sensitive screen 13;
- when the pressure reaches a predetermined pressure threshold, the processing unit detects the occurrence of a trigger touch gesture, and displays "ZOOM MODE";
- the user holds continuously the touch gesture (but here, contrary to the first example, he can drop the pressure);
- the processing unit 11 measures the duration of this continuous touch gesture up until the user lifts his finger, irrespective of the pressure, which is considered as the "duration of the stationary touch gesture".

Zoom Ratio

In a step (b), a zoom ratio is determined as a function of the measured duration, this determination step being typically performed by the processing unit 11, typically by determining this zoom ratio from the measured duration of the stationary touch gesture.

When compared with the previously discussed prior art method, the present method is more practical for accurately defining the zoom ratio and does not require to precisely perceive the pressure on the touch-sensitive screen. Even if the trigger or stationary touch gesture is a high force touch gesture, it simply requests being able to distinguish pressure under and over a single pressure threshold. Generally, pressure sensitive touchscreens are not able to measure the applied force but simply to distinguish different levels of force, for instance three levels. In such a case, it could be provided that a high force touch gesture is a touch gesture with the second or the third level of pressure.

It has to be understood that the zoom ratio may be a "zoom-in ratio", i.e. an enlargement ratio, or a "zoom-out ratio", i.e. a reduction radio, depending on whether the user wants to zoom in or zoom out ("zooming modes" will be discussed in the next part). In such a case the zoom ratio has always a value at least equal to one. Alternatively, the zoom ratio may have a value at least equal to one if zooming in, or below one if zooming out.

In other words, in a first embodiment, zooming in the image corresponds to multiplying its dimension by the zoom ratio while zooming out the image corresponds to dividing its dimension by the zoom ratio. In a second embodiment, zooming in or out the image always corresponds to multiplying its dimension by the zoom ratio.

Having a zoom ratio as a function of the duration allows a progressive zoom. In other words, the longer is the stationary touch gesture, the stronger is the zoom (in or out).

Preferably (and especially in the first embodiment of zoom ratio described previously), the zooming ratio is an increasing linear, polynomial or exponential function of the duration, for instance 20% of zoom ratio increase each second.

In other words, as a linear example:
after 1 s, the zoom ratio value is 1.2;
after 2 s, the zoom ratio value is 1.4;
after 3 s, the zoom ratio value is 1.6;
after 4 s, the zoom ratio value is 1.8;
etc.

As an exponential example:
after 1 s, the zoom ratio value is 1.05;
after 2 s, the zoom ratio value is 1.15;
after 3 s, the zoom ratio value is 1.3;
after 4 s, the zoom ratio value is 1.55;
etc.

In the case of the second embodiment, in "zooming in mode" the above scheme can be used, and in "zoom out mode", the zooming ratio may be a decreasing linear, polynomial or exponential function of the duration.

As a polynomial example:
after 1 s, the zoom ratio value is 0.8;
after 2 s, the zoom ratio value is 0.64;
after 3 s, the zoom ratio value is 0.512;
after 4 s, the zoom ratio value is 0.4096;
etc.

Zoomed Image Display

In a final step (c), the image zoomed by the determined zoom ratio is displayed on the touch-sensitive screen 13. As already explained, the size of the image is multiplied or divided by the zoom ratio according to the zooming mode or the type of zoom ratio.

In case of zoom in, the image may have to be cropped out so as to match the dimension of the interface. As also already explained, this step may alternatively imply controlling an optical zoom of a camera so that the zoomed image is accordingly displayed on the touch-sensitive screen 13.

It is to be noted that steps (a), (b) and (c) can be performed either sequentially (the zoom ratio is determined only when the user ends the stationary touch gesture), or simultaneously.

In the last case, step (b) and (c) are performed dynamically, meaning that the zoom ratio is either continuously determined (leading to a smooth zoom as long as the user keeps the stationary touch ratio), or step-by-step at a predetermined frequency, for instance each second (thus at each step the zoomed image is re-displayed).

It is to be noted that step (b) can take into account a predetermined "delay" in the determination of the zoom ratio. In other words, it may be provided that no zoom occurs (i.e. the zoom ratio values stays equal to one) if the duration is inferior to a minimum duration threshold, for instance 1 s, in case the user unwillingly performed the trigger touch gesture, Thus, in the previous example:
after 1 s, the zoom ratio value is still 1;
after 2 s, the zoom ratio value is 1.2;
after 3 s, the zoom ratio value is 1.4;
after 4 s, the zoom ratio value is 1.6;
after 5 s, the zoom ratio value is 1.8;
etc.

Zooming Mode

As already mentioned, a zooming mode is preferably chosen among a zoom-out mode and a zoom-in mode; the image being zoomed-in or zoomed-out by the determined zoom ratio according to the zooming mode.

This zooming mode may be specified ("ZOOM-IN MODE" or "ZOOM-OUT MODE") in the indication possibly displayed on the touch-sensitive screen 13 when the trigger touch gesture has been detected.

In a particularly advantageous embodiment, the method further comprises switching the zooming mode from zoom-out mode to zoom-in mode, or from zoom-in mode to zoom-out mode, after detecting a further trigger touch gesture by the user, on the touch-sensitive screen 13.

In other words, starting from an arbitrary default zooming mode (for instance zoom-in), the zooming mode will change at each time the trigger touch gesture is detected (i.e. at each time the method is repeated).

Advantageously, the first detected trigger touch gesture does not trigger the change of the zooming mode (but it triggers the measurement of the duration of the stationary touch gesture), so that the default zooming mode is applied for the first zooming on the image, and it is only when a second trigger touch gesture is detected not long after the first trigger touch gesture (for instance within 30 seconds after the first trigger touch gesture) that the zooming mode change is triggered by this second trigger touch gesture.

For example, zoom-in may be performed at the first, third, 2n+1-th, occurrences of the trigger touch gesture, while zoom-out may be performed at the second, fourth, 2n-th, occurrences of the trigger touch gesture.

This way, the user can easily correct a zoom-in operation which is too strong by a further zoom-out operation. The zoom ratio can be determined using the same increasing function in both zooming modes, the only difference being that the size of the image is multiplied by the zoom ratio in zoom-in mode, and divided by the zoom ratio in zoom-out mode.

At each repetition of the process, either a new zoom ratio is determined and applied to the currently zoomed image; or the same zoom ratio is modified and applied to the original image.

Alternatively, or in addition, the method may further comprise switching the zooming mode from zoom-out mode to zoom-in mode, or from zoom-in mode to zoom-out mode, if the measured duration exceeds a maximum duration threshold (for instance 10 s).

In other words, when keeping performing constantly the stationary touch gesture, a zoom-in operation is first carried out, until reaching the maximum duration, and then a zoom-out operation is carried out, or vice versa, etc.

When reaching the maximum duration threshold, the duration of the stationary touch gesture may be reset.

In such an embodiment, if the same increasing function is used for determining the zoom ratio in both modes, the size of the image will oscillate as long as the user performs the stationary touch gesture.

Terminal and Computer Program

The present invention concerns thus a mobile terminal 1 comprising a processing unit 11 and a touch-sensitive screen 13. This terminal 1 may also comprise a memory 12. The aforementioned processing unit 11 is in particular configured to implement, when detecting a stationary touch gesture on the touch-sensitive screen 13, and preferably when displaying an image, the steps of:

measuring (step a) the duration of a stationary touch gesture by the user on the touch-sensitive screen 13;

determining (step b) a zoom ratio as a function of this measured duration of the stationary touch gesture;

instructing the touch-sensitive screen 13 to display (step c) the image zoomed by the determined zoom ratio.

The touch-sensitive screen 13, on its side, is configured to acquire data representative of touch inputs from a user and to transmit such data to the processing unit 11 for interpretation, be it trigger touch gestures or stationary touch gestures, and to display the image zoomed by the determined zoom ratio.

While the measurement step (a) and determination step (b) have been presented as being carried out by a single processing unit 11, it is also possible to have dedicated processing units performing each step individually, the processing unit 11 being formed by the combination of these dedicated processing units.

The invention further proposes a computer program product, comprising code instructions for executing (in particular with a processing unit 11 of the terminal 1) the previously described method, as well as a computer-readable medium (in particular a memory 12 of the terminal 1), on which is stored a computer program product comprising code instructions for executing said method. In particular, this computer program product may correspond to the possibly dedicated software application discussed previously, and/or an application for displaying images.

The invention claimed is:

1. A method for zooming an image displayed on a touch-sensitive screen of a mobile terminal, the method comprising:

setting a zooming mode by default as a zoom-out mode or a zoom-in mode, measuring a duration of a stationary touch gesture by a user on the touch-sensitive screen, wherein the measuring is performed in response to detecting a first trigger touch gesture by the user on the touch-sensitive screen;

calculating a first zoom ratio value in response to said measured duration reaching a first duration value;

displaying on the touch-sensitive screen said image zoomed by the calculated first zoom ratio value according to the zooming mode;

calculating a second zoom ratio value in response to said measured duration reaching a second duration value which is greater than said first duration value, the second zoom ratio value being different from the first zoom ratio value;

displaying on the touch-sensitive screen said image zoomed by the calculated second zoom ratio value according to the zooming mode; and switching the zooming mode from the zoom-out mode to the zoom-in mode, or from the zoom-in mode to the zoom-out mode, in response to said measured duration exceeding a maximum duration threshold.

2. The method according to claim 1, wherein the stationary touch gesture and the first trigger touch gesture are the same touch gesture.

3. The method according to claim 1, wherein the first trigger touch gesture is a touch gesture chosen among a long duration touch gesture, a high force touch gesture and a given swipe touch gesture.

4. The method according to claim 1, wherein the stationary touch gesture is a touch gesture chosen among a long duration touch gesture and a high force touch gesture.

5. The method according to claim 1, wherein the calculating and the displaying are dynamically performed while the stationary touch gesture is not over.

6. The method according to claim 1, wherein at least one of the first zoom ratio value or the second zoom ratio value is calculated as an increasing linear, polynomial or exponential function of the measured duration.

7. The method according to claim 1, wherein the calculating and the displaying are performed only if said measured duration exceeds a minimum duration threshold.

8. The method according to claim 1, comprising switching the zooming mode each time a trigger touch gesture is detected.

9. The method according to claim 1, wherein switching the zooming mode comprises:

switching the zooming mode in response to detecting the second trigger touch gesture on the touch-sensitive screen if the second touch gesture is detected within a predetermined time from detection of the preceding first trigger touch gesture, else maintaining a same zooming mode in response to the second trigger touch gesture as used in response to the first trigger touch gesture.

10. The method according to claim 1, wherein the mobile terminal includes a processing unit, and the method is performed using the processing unit.

11. A mobile terminal comprising:

a touch-sensitive screen; and a processing unit configured to:

set a zooming mode by default as a zoom-out mode or a zoom-in mode;

measure a duration of a stationary touch gesture by a user on the touch-sensitive screen, wherein the measuring is performed in response to detecting a first trigger touch gesture by the user on the touch-sensitive screen;

calculate a first zoom ratio value in response to said measured duration reaching a first duration value;

instruct the touch-sensitive screen to display an image zoomed by the calculated first zoom ratio value according to the zooming mode;

calculate a second zoom ratio value in response to said measured duration reaching a second duration value which is greater than said first duration value, the second zoom ratio value being different from the first zoom ratio value;

instruct the touch-sensitive screen to display an image zoomed by the calculated second zoom ratio value according to the zooming mode; and switch the zooming mode from the zoom-out mode to the zoom-in mode, or from the zoom-in mode to the zoom-out mode, in response to said measured duration exceeding a maximum duration threshold.

12. A non-transitory computer-readable medium, on which is stored a computer program product comprising code instructions for executing a method for zooming an image displayed on a touch-sensitive screen of a mobile terminal when the instructions are executed by a processing unit, wherein the instructions configure the processing unit to:

measure a duration of a stationary touch gesture by a user on the touch-sensitive screen, wherein the measuring is performed in response to detecting a first trigger touch gesture by the user on the touch-sensitive screen;

set a zooming mode by default as a zoom-out mode or a zoom-in mode;

calculate a first zoom ratio value in response to said measured duration reaching a first duration value;

instruct the touch-sensitive screen to display an image zoomed by the calculated first zoom ratio value according to the zooming mode;

calculate a second zoom ratio value in response to said measured duration reaching a second duration value which is greater than said first duration value, the second zoom ratio value being different from the first zoom ratio value;

instruct the touch-sensitive screen to display an image zoomed by the calculated second zoom ratio value according to the zooming mode; and switch the zooming mode from the zoom-out mode to the zoom-in mode, or from the zoom-in mode to the zoom-out mode, in response to said measured duration exceeding a maximum duration threshold.

* * * * *